E. L. BERGSTRESSER.
Harvester Rake.
No. 61,704.    Patented Feb. 5, 1867.
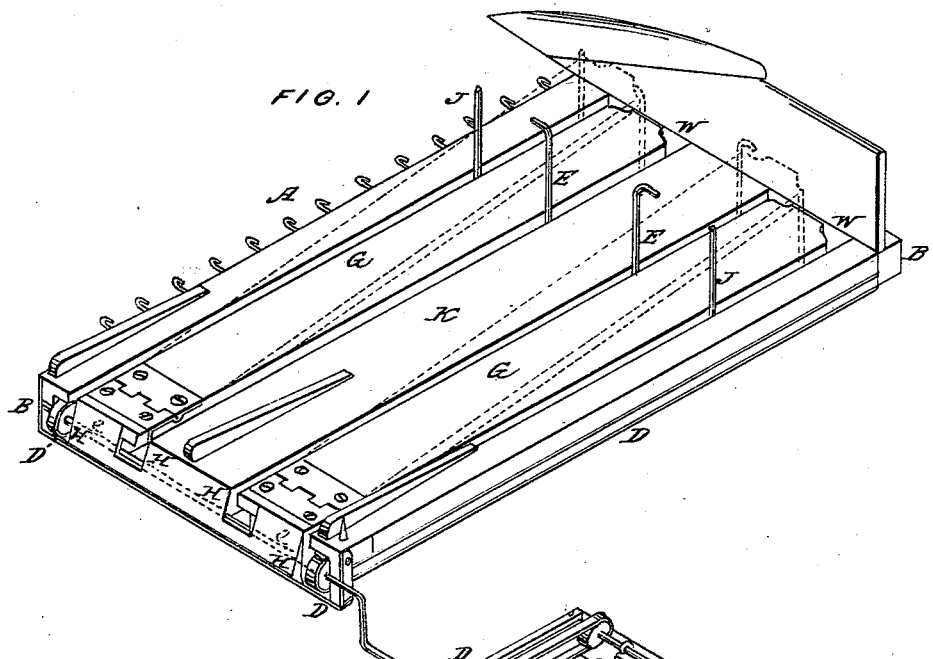
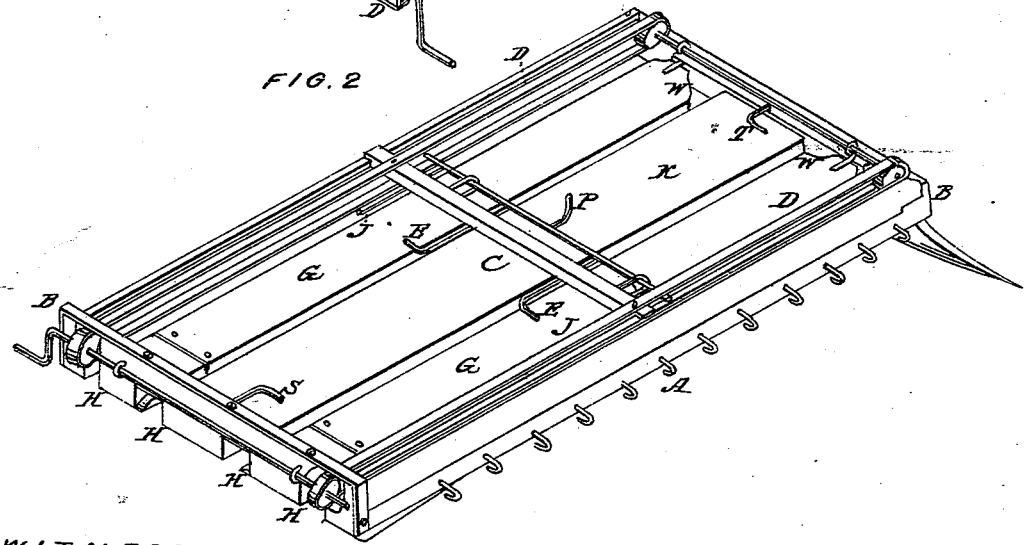

United States Patent Office.

EDWIN L. BERGSTRESSER, OF HUBLERSBURG, PENNSYLVANIA.

Letters Patent No. 61,704, dated February 5, 1867.

IMPROVEMENT IN HARVESTER RAKES.

The Schedule referred to in these Letters Patent and making part of the same.

TO ALL WHOM IT MAY CONCERN:

Be it known that I, EDWIN L. BERGSTRESSER, of Hublersburg, Centre county, State of Pennsylvania, have invented new and useful improvements in Self-Raker for Harvesting Machines; and I do hereby declare the following to be a clear and exact description thereof, reference being had to the accompanying drawings, and to the letters of reference marked thereon, making a part of this specification, in which—

Figure 1 represents a top view of the platform and rake; and

Figure 2, an underside view.

My invention consists in the shape of the teeth; the hinged slats forming the platform and the travelling rake-head.

A represents the front of the machine where the knives operate; B, the square frame; C, the rake-head underneath the platform, and operated by an endless belt D; E, the teeth forming the rake, which are fastened to the rake-head, and move erect across the platform, passing between the slats G, drawing the sheaf with them until the sheaf is thrown off at the one end of the platform; and the bent lever P (permanently attached to the rake-head) comes in contact with the bent stop S at the end of the platform, when the teeth E fall and pass through the apertures H, and under the slats, back again to the opposite end of the platform, until the bent lever P comes in contact with the opposite bent stop T, when the teeth E, at the same time, raise the slats G until the teeth E pass upward through the openings or offsets W at the ends of the slats G, and the teeth commence to rake or carry off the grain. The middle teeth E are bent at an angle at their outer ends to assist in raising the slats G. The outer teeth are straight, and not bent at the top, as seen at J. The centre slat K is stationary, but the outer slats G are hinged at the inner end, so that, as the teeth raise the slats at their opposite ends, they assist, by their inclination, in throwing off the sheaf.

What I claim as my invention, and desire to secure by Letters Patent, is—

1. The hinged slats of the platform, arranged so as to rise and let the teeth pass up, and also assist in carrying the sheaf off, as herein described.

2. I also claim the construction and arrangement of the rake-teeth so as to pass under or in the platform at one end thereof, and raise the free ends of the hinged slats as they rise at the other end, to carry off the sheaf.

3. I also claim the combination of a platform, provided with two or more hinged slats and an automatic reciprocating rake, substantially as herein described, and for the purposes set forth.

EDWIN L. BERGSTRESSER.

Witnesses:
JESSE L. TEST,
JAS. TEST.